(12) United States Patent
Nakajima

(10) Patent No.: US 8,899,888 B2
(45) Date of Patent: Dec. 2, 2014

(54) TIP DRESSER

(71) Applicant: Kyokutoh Co., Ltd., Nagoya-shi, Aichi (JP)

(72) Inventor: Kotaro Nakajima, Nagoya (JP)

(73) Assignee: Kyokutoh Co., Ltd., Aichi (JP)

( * ) Notice: Subject to any disclaimer, the term of this patent is extended or adjusted under 35 U.S.C. 154(b) by 195 days.

(21) Appl. No.: 13/805,654

(22) PCT Filed: Sep. 18, 2012

(86) PCT No.: PCT/JP2012/073797
§ 371 (c)(1),
(2), (4) Date: Dec. 19, 2012

(87) PCT Pub. No.: WO2013/061710
PCT Pub. Date: May 2, 2013

(65) Prior Publication Data
US 2014/0064863 A1    Mar. 6, 2014

(30) Foreign Application Priority Data
Oct. 26, 2011   (JP) .................................. 2011-234924

(51) Int. Cl.
| | |
|---|---|
| *B23Q 11/08* | (2006.01) |
| *B23B 5/16* | (2006.01) |
| *B23B 25/00* | (2006.01) |
| *B23B 27/00* | (2006.01) |
| *B24B 19/16* | (2006.01) |
| *B23K 11/11* | (2006.01) |
| *B23K 11/31* | (2006.01) |
| *B23K 11/30* | (2006.01) |

(52) U.S. Cl.
CPC ............. *B23K 11/3063* (2013.01); *B23K 11/30* (2013.01); *B23B 5/16* (2013.01); *B23B 25/00* (2013.01); *B23B 27/00* (2013.01); *B24B 19/16* (2013.01); *B23K 11/115* (2013.01); *B23K 11/31* (2013.01)
USPC ................................ 409/140; 407/42; 407/48

(58) Field of Classification Search
USPC .............. 407/42, 48, 103; 409/140, 137, 138, 409/139
See application file for complete search history.

(56) References Cited

U.S. PATENT DOCUMENTS 5,725,340 A  *  3/1998  Nakajima et al. ............. 409/140
7,192,227 B2 *  3/2007  Nordstrom et al. ........... 409/140
(Continued)

FOREIGN PATENT DOCUMENTS

| FR | 2 846 897 A1 | 5/2004 |
| JP | 10-202406 A | 8/1998 |

(Continued)

OTHER PUBLICATIONS

International Search Report for the Application No. PCT/JP2012/073797 mailed Nov. 20, 2012.

*Primary Examiner* — Will Fridie, Jr.
(74) *Attorney, Agent, or Firm* — Cheng Law Group, PLLC

(57) ABSTRACT

What is provided is a tip dresser (10) capable of smoothly discharging shavings (70) by a breaker (60) provided on a cutter (40). The tip dresser includes a cutter (40) having cutting blades (47) for cutting the tip end portions (2) of a pair of electrode tips (1) and an attaching hole (50), a holder (20) to which the cutter is attached by screwing an attaching screw (55) inserted through the attaching hole, and a rotary drive portion that holds rotatably the holder. On the surface side (46) of the cutter, the breaker (60) for discharging shavings is disposed. The breaker is formed into a plate shape having an insertion hole (62) through which the attaching screw is inserted to tighten the breaker together with the cutter by an attaching screw. The breaker has, on the periphery of an attaching substrate portion (61) extending in a substantially plane shape from the peripheral edge of the insertion hole, inclined guide surfaces (65) that guide the shavings (70) produced from the portions of the cutting blades away from the surface side (46) are formed to bulge from flat portions (49) near the cutting blades while inclining from the flat portions.

16 Claims, 14 Drawing Sheets

(56) References Cited

U.S. PATENT DOCUMENTS

| | | | |
|---|---|---|---|
| 7,789,600 B2* | 9/2010 | Goto et al. | 409/140 |
| 8,388,283 B2* | 3/2013 | Decker et al. | 409/137 |
| 2009/0279974 A1* | 11/2009 | Goto et al. | 409/140 |
| 2012/0093593 A1* | 4/2012 | Lutz | 407/30 |
| 2012/0126471 A1* | 5/2012 | Park | 269/285 |
| 2014/0064863 A1* | 3/2014 | Nakajima | 407/42 |

FOREIGN PATENT DOCUMENTS

| | | |
|---|---|---|
| JP | 11-47953 A | 2/1999 |
| JP | 2003-334666 A | 11/2003 |
| WO | WO-2009/095237 A1 | 8/2009 |

* cited by examiner

TIP DRESSER

TECHNICAL FIELD

The present invention relates to a tip dresser that cuts the tip end portions of a pair of electrode tips held by a welding gun, and in particular, to a tip dresser including a breaker for smoothly discharging shavings provided on a cutter to be used for cutting.

BACKGROUND ART

A conventional tip dresser includes a plate-shaped cutter, a holder to which the cutter is attached, and a rotary drive portion that holds rotatably the holder to which the cutter is attached (for example, refer to Patent Document 1). To enable simultaneous cutting of tip end faces of the tip end portions of a pair of electrode tips opposed to each other and expanding portions expanding from the tip end faces, this cutter has cutting blades having substantially ¼ arc shapes corresponding to the external shapes of substantially the halves of the tip end portions on one side with respect to the central axis of the pair of electrode tips so that the cutting blades are provided on both edges in the width direction of the tip end sides disposed on the central axis side of the electrode tips at the edge of the surface side being one side in the thickness direction. The cutter has an attaching hole perforating through the cutter on a base portion side away from the portion between the two cutting blades.

The holder has receiving surfaces recessed so as to receive tip end portions of a pair of electrode tips on both end face sides, and an attaching surface which is a part of a discharging recess for discharging shavings formed to penetrate along a rotation central axis at the time of cutting that matches the central axis of the electrode tips, and to the attaching surface, the cutter is attached by putting the back side that is opposite to the surface side of the cutter and becomes the cutting blade side on the attaching surface and screwing an attaching screw inserted through the attaching hole.

When a breaker for discharging shavings is disposed, the breaker is disposed on the surface side of the cutter, and is constituted by the head portion of the attaching screw or a welded triangular plate (for example, refer to Patent Document 2).

PRIOR ART DOCUMENT

Patent Documents

Patent Document 1: JP 2003-334666 A
Patent Document 2: JP H11-47953 A

SUMMARY OF THE INVENTION

Problem to be Solved by the Invention

However, like the tip dresser described in Patent Document 2, when the breaker is constituted by the head portion of the attaching screw for attaching the cutter to the holder, a strip of shaving shaved continuously hits against the columnar head portion of the attaching screw around the attaching hole away from the cutting blades, and may roll into a coiled shape with a large diameter, and in this case, the shaving in the large coiled shape jams inside the discharging recess for discharging shavings of the holder, so that there is room for improvement for smooth discharge of shavings.

In a case where the breaker is formed of a triangular plate that is welded to the cutter, no detailed description about the disposition and the end face shape of the triangular plate is given in Patent Document 2. Therefore, when the edge of the triangular plate is away from the cutting blades, a state where a strip of shaving shaved continuously hits against the edge of the triangular plate away from the cutting blades and is rolled into a coiled shape in which a large diameter cannot be avoided, so that the same problem as described above is caused.

The present invention solves the above-described problem, and an object thereof is to provide a tip dresser capable of smoothly discharging shavings by a breaker provided on the cutter.

Means for Solving the Problem

A tip dresser according to the present invention includes a plate-shaped cutter that has cutting blades having shapes corresponding to the external shapes of substantially the halves of the tip end portions on one side with respect to the central axis of a pair of electrode tips on both edges in the width direction of the tip end sides disposed on the central axis side at the edge of the surface side being one side in the thickness direction so as to cut tip end faces of the tip end portions of the pair of electrode tips opposed to each other and expanding portions expanding from the tip end faces simultaneously, a holder that has receiving surfaces recessed so as to receive the tip end portions of the pair of electrode tips on both end face sides, and an attaching surface which is a part of a discharging recess for discharging shavings formed to penetrate along a rotation central axis at the time of cutting that matches the central axis, and to which the cutter is attached by putting the back side that is opposite to the surface side and becomes the cutting blade side of the cutter on the attaching surface and screwing an attaching screw inserted through the attaching hole, and a rotary drive portion that holds rotatably the holder to which the cutter is attached, where a breaker for discharging shavings is disposed on the surface side of the cutter, wherein the breaker is formed to have a plate shape having a through hole through which the attaching screw is inserted so that the breaker is tightened together with the cutter by the attaching screw, and includes an attaching substrate portion that extends in substantially a plane shape from a peripheral edge of the insertion hole to be pressed by the head portion of the attaching screw at the time of tightening, and inclined guide surfaces that are disposed on the outer peripheral edge of the breaker around the attaching substrate portion, and are disposed near the cutting blades so as to bulge from flat portions of the surface side while inclining from the flat portions and guide the shavings produced from the portions of the cutting blades to separate the shavings away from the surface side.

In the tip dresser according to the present invention, the cutter is attached to the holder while the breaker is tightened together with the cutter by using the attaching screw, and after the holder is held by the rotary drive portion, the holder is rotated and the pair of electrode tips are pressed against the predetermined receiving surfaces of the holder from the tip end face sides of the tip end portions, and accordingly, the cutting blades of the cutter cut the tip end portions of the electrode tips into predetermined shapes.

At this time, a strip of shaving extends continuously along the flat portion near the cutting blade from the cutting blade of the cutter. However, each of the inclined guide surfaces disposed on the outer peripheral edge of the breaker is inclined to bulge from the flat portion while inclining from the flat portion on the surface side near the cutting blade of the cutter, and the tip end of the shaving is guided by the inclined guide surface on the outer peripheral edge of the breaker and curved, and further pushed out by the following shaving. At this time, the following shaving is also guided by the inclined guide surface and curved when it pushes the tip end side of the shaving out, so that the shaving is rolled into a coiled shape rolled around the tip end side. The shaving in the coiled shape becomes small in diameter since the inclined guide surface is disposed near the cutting blade, and before the size of the shaving reaches a large size that jams inside the discharging recess, the shaving separates from the following shaving and falls from the discharging recess due to its weight, etc., and as a result, the shaving in a coiled shape with a small diameter is smoothly discharged from the discharging recess of the holder.

Therefore, in the tip dresser according to the present invention, shavings can be smoothly discharged by the breaker provided on the cutter, and the tip end portions of the electrode tips can be efficiently and finely cut and the work can be quickly shifted to the next welding work.

In the tip dresser according to the present invention, the breaker is formed into a plate shape separate from the cutter and tightened to the holder together with the cutter by the attaching screw, and the breaker serves as a washer of the attaching screw, so that it contributes to improvement in attaching strength of the cutter to the holder.

Further, in the tip dresser according to the present invention, it is preferable that the breaker is disposed so that the shortest distance on the outer peripheral edge of the inclined guide surface of the breaker to the cutting blade is set in the range of 0.3 to 1.5 mm, and the inclination angle of each inclined guide surface from the flat portion is set in a range of 30 to 60 degrees as an angle that prevents a straight line extended along the inclination angle to the attaching screw side from the closest position on the outer peripheral edge of the inclined guide surface to the cutting blade from crossing the head portion of the attaching screw.

With this configuration, at the closest position on the inclined guide surface of the breaker to the cutting blade, the inclination angle of each inclined guide surface is set in the range of 30 to 60 degrees as an angle that prevents the straight extended line extended from the inclined guide surface to the attaching screw side from crossing the head portion of the attaching screw, so that a shaving extending from the cutting blade can be stably rolled into a coiled shape with a small diameter without contact with the head portion of the attaching screw by the breaker.

Incidentally, if the inclination angle is less than 30 degrees, it is difficult to roll the shaving into a coiled shape with a small diameter, and if the inclination angle is as large as 60 degrees or more, the shaving easily hits against the electrode tip and a fine cut surface is hardly secured, so that the inclination angle of the inclined guide surface at the closest position to the cutting blade is set in the range of 30 to 60 degrees, preferably about 45 degrees in the range of 40 to 50 degrees.

Further, by setting the distance at the closest position on the inclined guide surface of the breaker to the cutting blade, that is, the shortest distance on the inclined guide surface to the cutting blade in the range of 0.3 to 1.5 mm, cutting of the cutting blade is prevented from being obstructed, and the shaving can be formed into a coiled shape with a small diameter and discharged. Specifically, if the shortest distance of the inclined guide surface is less than 0.3 mm and the inclined guide surface is excessively close to the cutting blade, a part of the tip end portion of the electrode tip before being cut may hit against a part of the breaker earlier than the cutting blade and obstruct cutting of the cutting blade. If the shortest distance of the inclined guide surface is as large as 1.5 mm or more, the diameter of the coiled shaving cannot be made small, and the operation and effect of forming a shaving in a coiled shape with a large diameter and discharging it from the discharging recess may be obstructed.

As a result, in order to obtain the operation and effect of forming shavings into a coiled shape with a small diameter and discharging the shavings without obstructing cutting of the cutting blade, the shortest distance on the inclined guide surface to the cutting blade is in the range of 0.3 to 1.5 mm, and preferably in the range of 0.6 to 1.2 mm.

In the tip dresser according to the present invention, the cutter is provided with, on the peripheral edge of the attaching hole on the surface side, a breaker housing recess recessed in a shape equal to at least the shape of the outer peripheral edge on the cutting blade side of the breaker so as to house at least a cutter-side portion on the cutting blade side of the breaker, and the breaker housing recess is formed to have a depth that divides each inclined guide surface into a housed region that is housed in the breaker housing recess and a projecting region that projects from the flat portion in the breaker thickness direction when the breaker housing recess houses the breaker.

With this configuration, the edge on the cutting blade side of the inclined guide surface of the breaker is housed inside the breaker housing recess. Therefore, the edge of the inclined guide surface is disposed so as to sink to the cutter side from the flat portion near the cutting blade of the cutter, and even if the tip end of a shaving moves along the flat portion just before coming into contact with the inclined guide surface, the tip end smoothly comes into contact with the inclined guide surface from the flat portion and is curved. Incidentally, when the outer peripheral edge of the inclined guide surface bulges from the flat portion, if a small clearance is formed between the outer peripheral edge of the inclined guide surface and the flat portion, the tip end of the shaving may enter the clearance and jams at the outer peripheral edge of the inclined guide surface, however, the above-described configuration can avoid such jamming.

In the tip dresser according to the present invention, the outer peripheral edges of two of the inclined guide surfaces corresponding to the cutting blades on both edges of the cutter are preferably formed to be straight symmetrically to each other about the center between the cutting blades on both edges of the cutter.

With this configuration, when a shaving produced from the cutting blade is formed into a strip-like coiled shape, the length in the width direction of the strip of the shaving can be easily secured as long as the length of the straight portion of the outer peripheral edge of the inclined guide surface, and as a result, the shaving becomes a coiled shape with a small diameter that is a long tubular body and is smoothly discharged without jamming inside the discharging recess.

In the above-described configuration, the breaker is preferably configured to be housed in the breaker housing recess provided on the cutter. This is because even if the outer peripheral edges of the inclined guide surfaces of the breaker are straight, the breaker is housed in the breaker housing recess, and when tightening the attaching screw, the breaker does not rotate and the inclined guide surfaces being the straight outer peripheral edges can be disposed near the cutting blades without positional deviations.

When the breaker is formed into a substantially square plate shape, it is preferable that the inclined guide surfaces corresponding to the cutting blades on both edges of the cutter are formed on straight portions of two sides adjacent to each other of the substantially square shape of the breaker, and on straight portions of the remaining two sides other than the two sides having the inclined guide surfaces of the breaker, the inclined guide surfaces are not provided but the attaching substrate portion is extended, and side surfaces along the thickness direction of the breaker are provided.

With this configuration, after the external shape of the breaker is cut out from a breaker material, not all of the straight portions of the four sides need to be provided with inclined guide surfaces, so that the number of manufacturing processes and manufacturing cost of the breaker can be reduced.

Further, in the tip dresser according to the present invention, the breaker may have a disk shape having the insertion hole disposed at the center and the inclined guide surface provided on the entire circumference of the outer peripheral edge.

With this configuration, the breaker has a disk shape, so that when the breaker is tightened to the holder together with the cutter by the attaching screw, even if the breaker rotates, the position where the inclined guide surface is disposed with respect to the cutting blades does not change, so that the breaker and cutter can be easily tightened together to the holder.

BEST MODE FOR CARRYING OUT THE INVENTION

Figure 8:
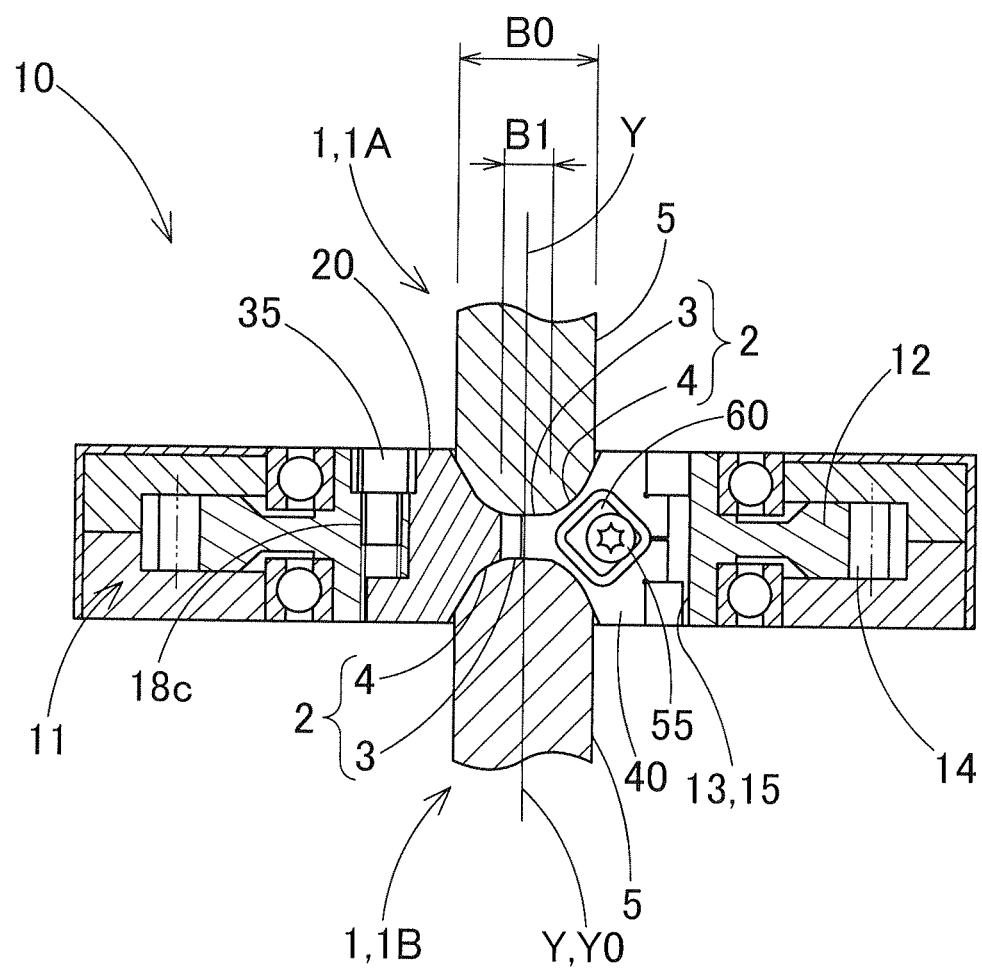
FIG. 8 is a longitudinal sectional view when cutting electrode tips in the tip dresser according to the first embodiment.

Hereinafter, an embodiment of the present invention is described with reference to the drawings. As shown in FIG. 8, a tip dresser 10 according to a first embodiment shapes a pair of electrode tips 1 (1A and 1B) to make these reusable for spot welding by cutting the tip end portions 2 of the electrode tips 1 deformed by a plurality of welding works. The tip dresser 10 includes a cutter 40 that cuts the electrode tips 1A and 1B, a holder 20 that holds the cutter 40 by attaching the cutter 40 thereto by an attaching screw 55, a rotary drive portion 12 that holds rotatably the holder 20 to which the cutter 40 is attached, and a breaker 60 to be tightened to the holder 20 together with the cutter 40 by the attaching screw 55.

Each of the electrode tips 1A and 1B includes, on the tip end portion 2, a tip end face 3 in a substantially circular plane shape, and an expanding portion 4 that increases in diameter so as to curve from the tip end face 3 and is connected to a columnar base portion 5. In the case of the embodiment, the diameters B0 of the electrode tips 1A and 1B are set to φ16 and the diameters B1 of the tip end faces 3 are set to φ6.

The cutter 40 has a plate shape having cutting blades 47 (47A and 47B) shaped corresponding to the external shapes of substantial halves of the tip end portions 2 on one side from the central axis Y of the electrode tips 1, disposed on both edges in the width direction on the tip end portion 41 side disposed on the central axis Y side on the edge of the surface side 46 being one side in the thickness direction (refer to FIG. 1 to FIG. 4). Specifically, each cutting blade 47 includes a tip end side portion 47a that cuts the tip end face 3 and an expanding side portion 47b having a substantially ¼ arc shape that cuts the expanding portion 4 (refer to FIG. 3).

An attaching hole 50 through which the attaching screw 55 is inserted is formed to perforate through the cutter 40 on the base portion 42 side away from the portion between the two cutting blades 47A and 47B as shown in FIG. 1 to FIG. 4. On the base portion 42, positioning recesses 43 and 44 recessed in rectangular shapes are formed on both edges in the width direction. When the back side 53 opposite to the surface side 46 on the cutting blade 47 side is put on an attaching surface 23 of the holder 20 and the cutter 40 is screw-fastened by the attaching screw 55, the cutter is positioned by putting the tip end face 41 on a positioning projection 24 of the holder 20 and fitting positioning projections 25 and 26 of the holder 20 to positioning recesses 43 and 44, and attached to the holder 20.

Figure 15A:
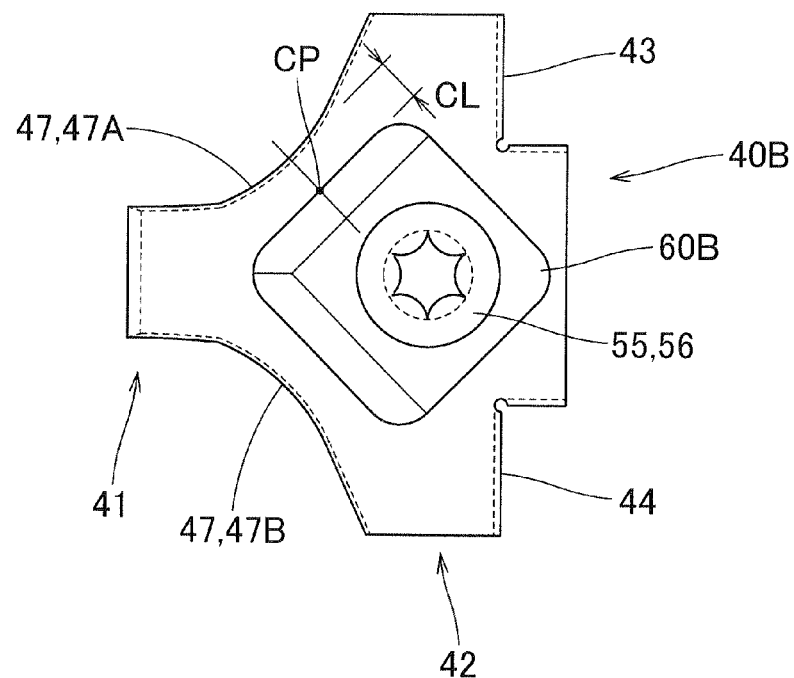
FIG. 15 is a front view showing a state where a cutter and a breaker are attached to a holder and components according to a third embodiment.
Figure 15B:
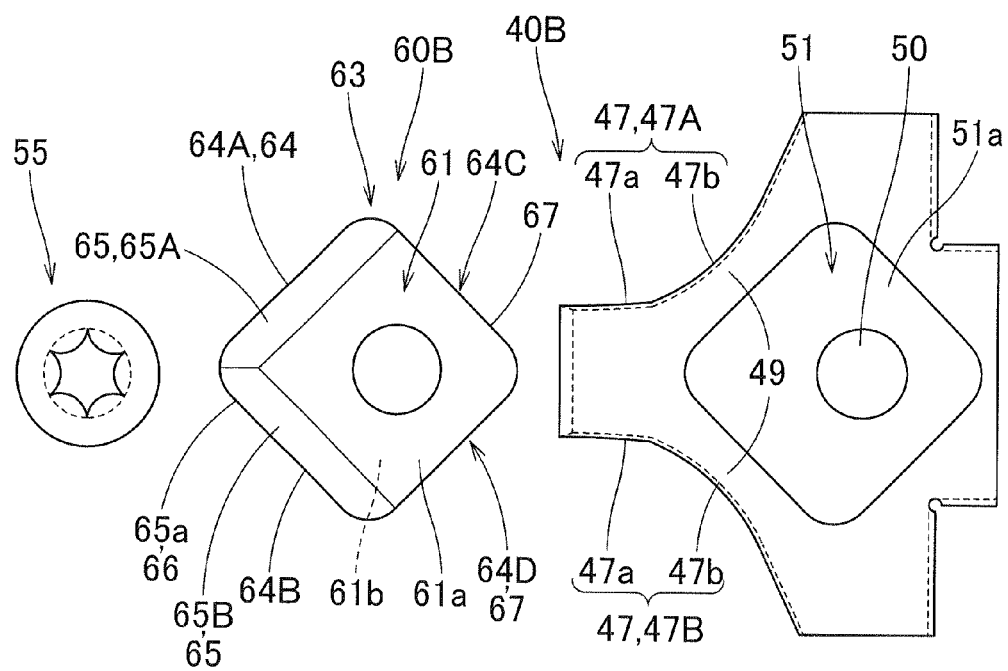

At the peripheral edge of the attaching hole 50, a slit 52 continuing to the end face on the base portion 42 side is formed. This slit 52 is formed as appropriate for attaching the cutter 40 to the holder 20 without slippage, and may not be provided (refer to the cutter 40B according to the third embodiment shown in FIG. 15).

On this cutter 40, a breaker housing recess 51 having a substantially square shape whose corners are rounded is formed on the peripheral edge of the attaching hole 50 of the surface side 46. The depth T0 of the bottom surface 51a of the breaker housing recess 51 from a flat portion 49 near the cutting blade 47 on the surface side 46 is set to 1 mm that is substantially half the thickness T1 described later of the breaker in the case of the embodiment (refer to B of FIG. 4).

The external shape of the cutter 40 is cut out from a metal plate of a high-speed tool steel or the like by a wire cutter while the attaching hole 50 and the slit 52 are formed, and after the breaker housing recess 51 is machined by cutting, the cutter is subjected to heat treatment such as quenching, and further, to form the cutting blades 47A and 47B, the flat portions 49, etc., are barrel-polished, and further, the flat portions 49 are buff-finished, whereby manufacturing the cutter 40. The heat treatment may be performed before the external shape is cut out.

The breaker 60 is formed of a metal plate of a machine structure carbon steel, etc., into a substantially square plate shape having an insertion hole 62 through which the attaching screw 55 is inserted so that the breaker 60 is tightened together with the cutter 40 by the attaching screw 55. This breaker 60 includes an attaching substrate portion 61 that extends in a substantially plane shape from the peripheral edge of the insertion hole 62 and is pressed by the head portion of the attaching screw 55 when the breaker is tightened together with the cutter, and inclined guide surfaces 65 disposed on the outer peripheral edge 63 of the breaker 60 around the attaching substrate portion 61.

In the case of the embodiment, the attaching screw 55 includes the head portion 56 with a hexalobular hole, and a male thread portion 57 extending from the head portion 56.

The outer peripheral edge 63 of the breaker 60 includes four straight portions 64 (64A, 64B, 64C, and 64D) corresponding to the four sides of the substantially square shape, and each straight portion 64 includes the inclined guide surface 65 on the surface 61a side of the attaching substrate portion 61, and a rising surface 66 on the back side 61b. The inclined guide surfaces 65 (65A and 65B) are disposed near the cutting blades 47A and 47B so as to bulge from the flat portions 49 while inclining from the flat portions 49 of the surface side 46 near the cutting blades 47A and 47B, and guide shavings 70 produced from the portions of the cutting blades 47A and 47B so as to separate the shavings 70 away from the surface side 46.

Then, in the case of the embodiment, the outer peripheral edges 65a of the inclined guide surfaces 65A and 65B that are near the cutting blades 47A and 47B and correspond to the cutting blades 47A and 47B are formed on straight portions 64A and 64B symmetrical to each other about the center between the cutting blades 47A and 47B.

In other words, on the straight portions 64A and 64B of two straight sides on the outer peripheral edge of the breaker 60 in a substantially square shape, the inclined guide surfaces 65A and 65B are formed.

Figure 1:
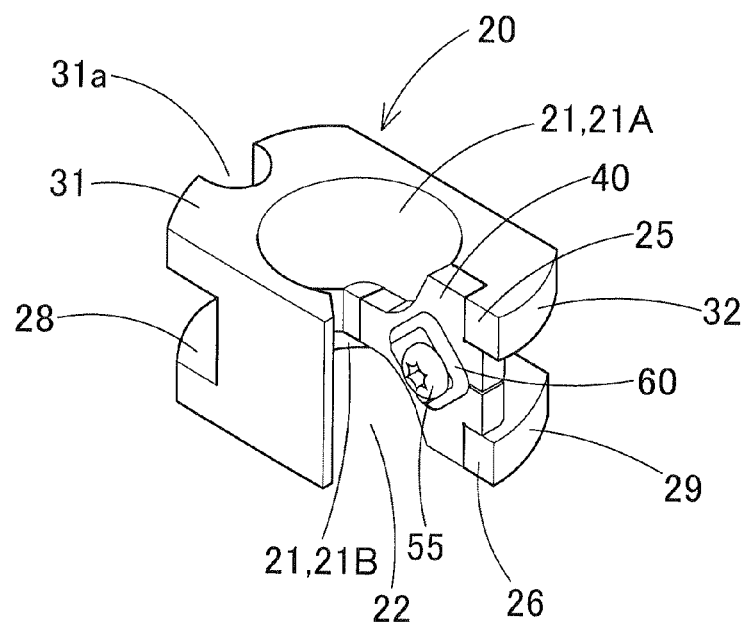
FIG. 1 is a perspective view showing a state where a cutter and a breaker are tightened together to a holder in a tip dresser according to a first embodiment of the present invention.
Figure 2:
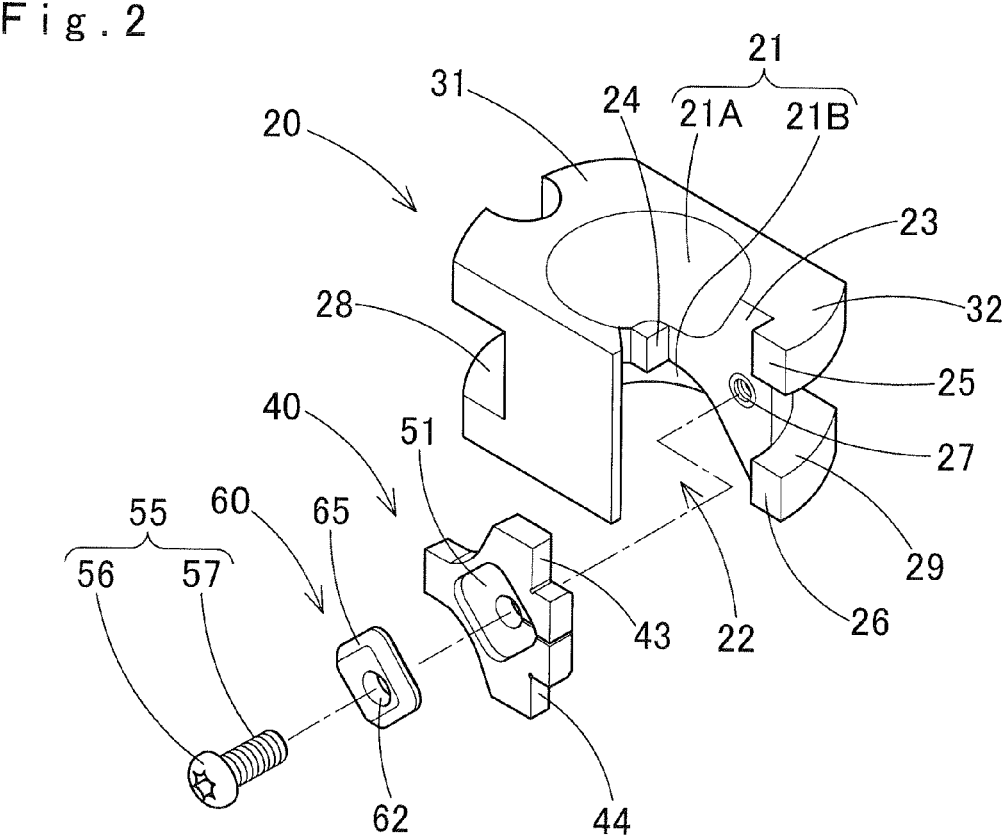
FIG. 2 is an exploded perspective view of the holder, the cutter, the breaker, and an attaching screw in the tip dresser according to the first embodiment.
Figure 3A:
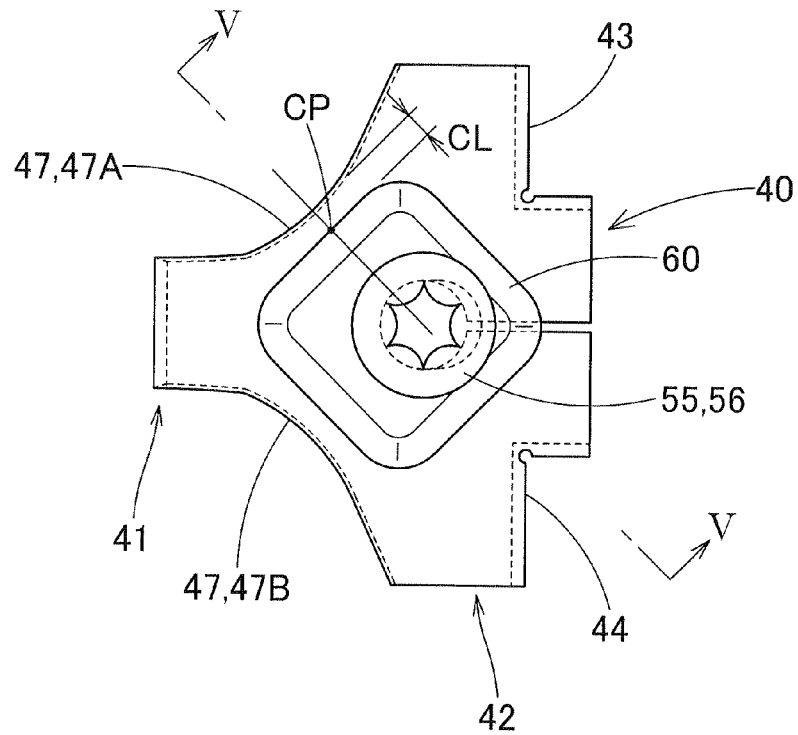
FIG. 3 is a front view showing a state where the cutter and breaker are attached to the holder and components according to the first embodiment.
Figure 3B:
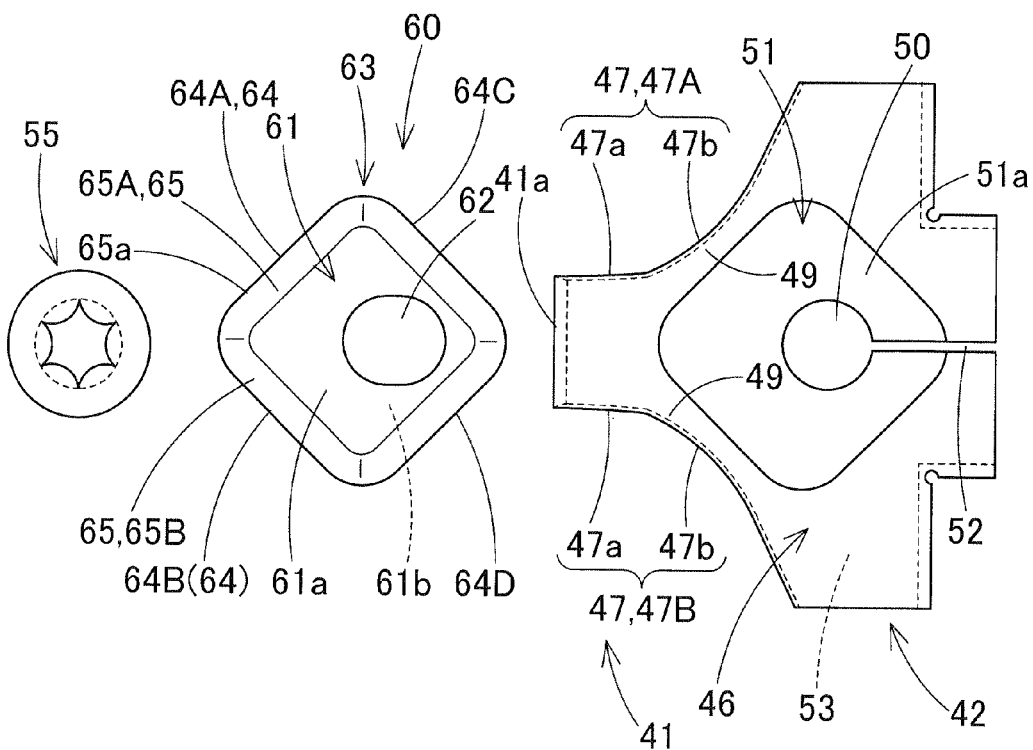
Figure 4A:
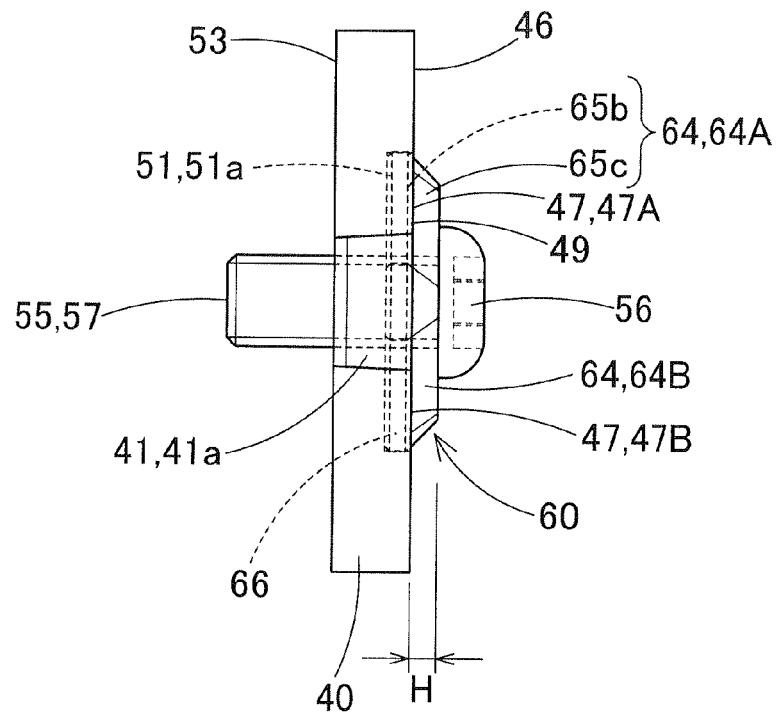
FIG. 4 is a side view showing a state where the cutter and the breaker are attached to the holder and components according to the first embodiment.
Figure 4B:
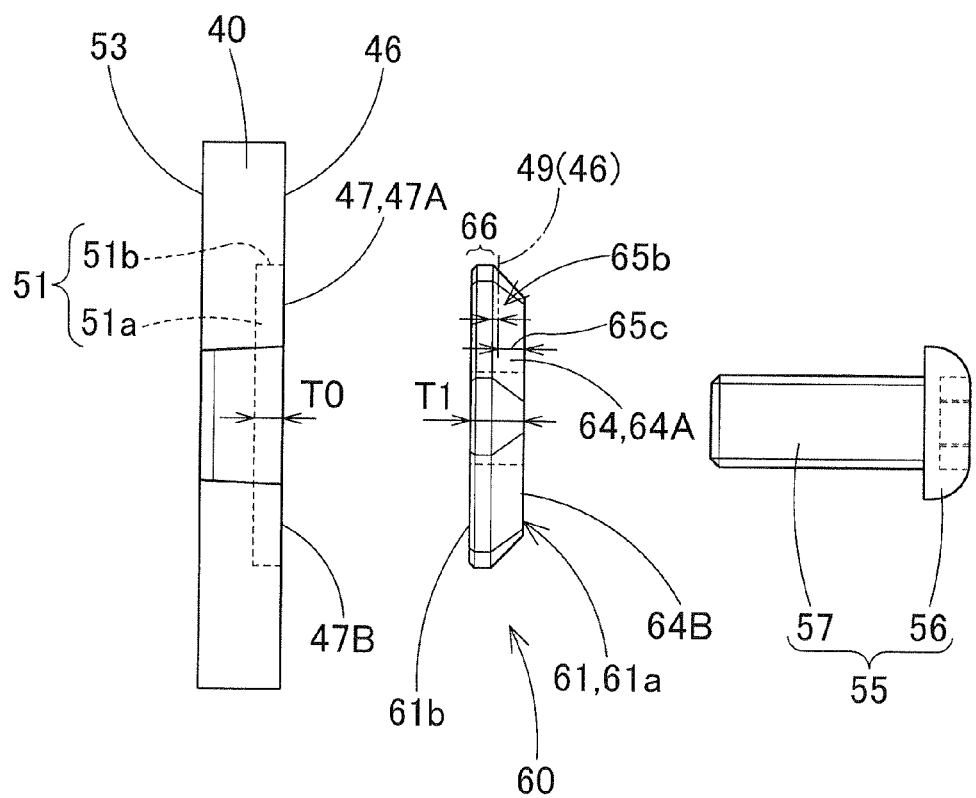
Figure 5A:
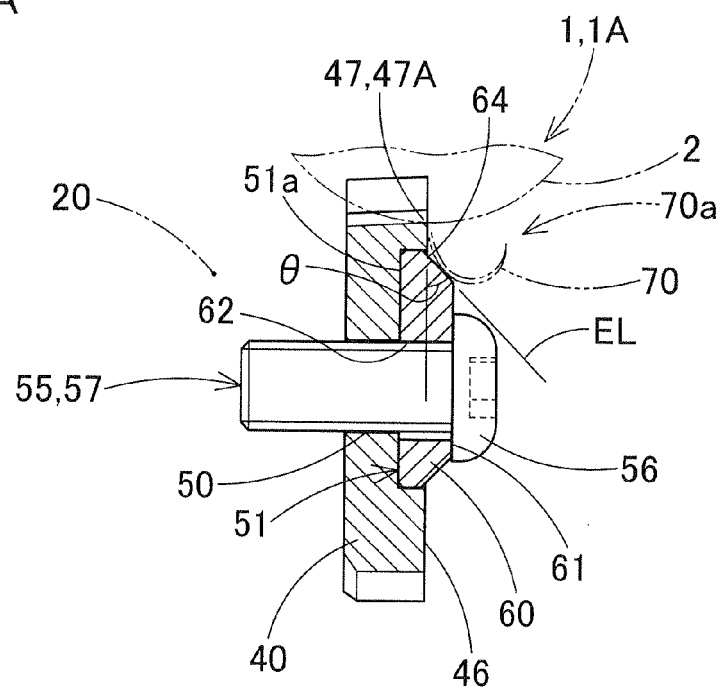
FIG. 5 is a view describing a state of a shaving when an electrode tip is cut with the tip dresser according to the first embodiment, corresponding to a section taken along V-V in FIG. 3.
Figure 5B:
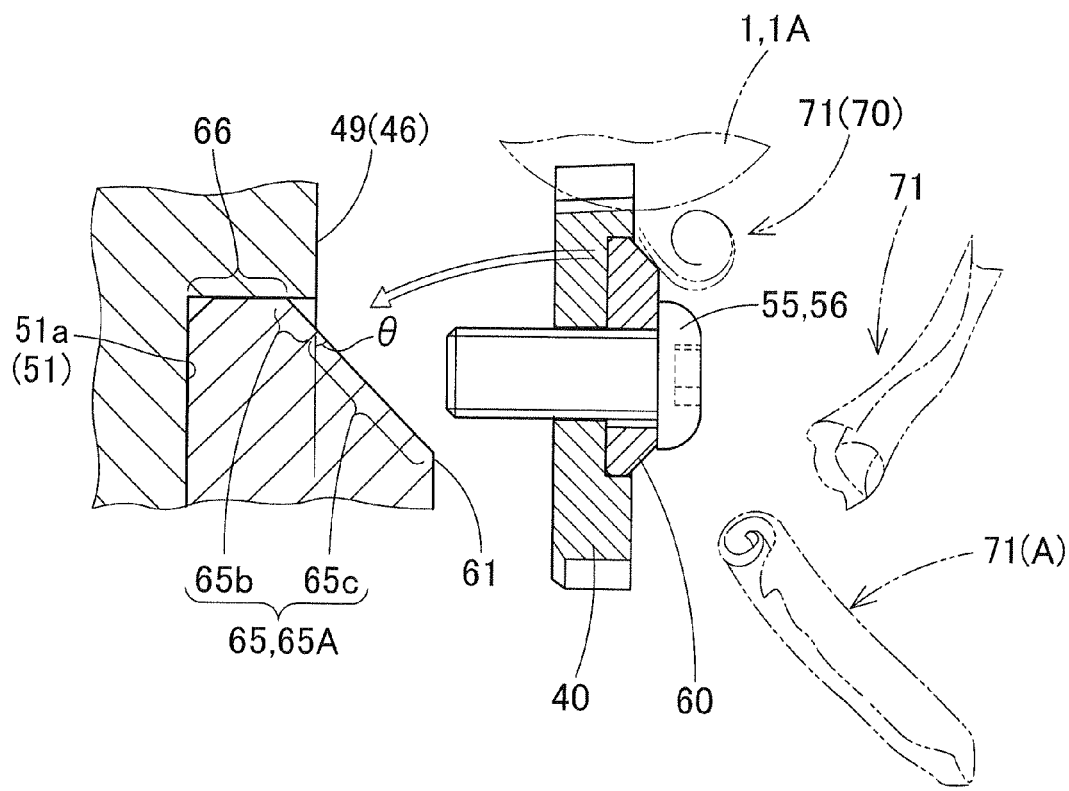

In this breaker 60, the shortest distance CL (refer to FIG. 3) on the outer peripheral edge 65a of the inclined guide surface 65A, 65B to the cutting blade 47A, 47B is set to 1 mm in the range of 0.3 to 1.5 mm, Further, as shown in FIG. 3 and FIG. 5, the inclination angle θ of the inclined guide surface 65A, 65B from the flat portion 49 is set in the range of 30 to 60 degrees as an angle that prevents the straight line (extended line) extended along the inclination angle to the attaching screw 55 side from the closest position CP on the outer peripheral edge 65a of the inclined guide surface 65A, 65B to the cutting blade 47A, 47B from crossing the head portion 56 of the attaching screw 55. In the case of the embodiment, the inclination angle θ is set to 45 degrees.

Further, in the case of the embodiment, the inclined guide surface 65A, 65B of the breaker 60 is configured to be divided into a housed region 65b that is housed in the breaker housing recess 51 and the projecting region 65c that projects from the flat portion 49 as shown in FIG. 5 when the back side 61b is put on the bottom surface 51a and the breaker 60 is housed in the breaker housing recess 51 of the cutter 40. Of course, the projecting height H of the projecting region 65c is set so as to separate shaving 70 produced from the cutting blade 47A, 47B away from the surface side 46. This projecting height H (refer to FIG. 4) is set in the range of 0.5 to 3 mm, preferably in the range of 1 to 2 mm not to narrow the discharging recess 22 as much as possible in the range capable of forming the shaving 70 into a coiled shape. In the case of the embodiment, the projecting height H is set to 1 mm.

In the case of the embodiment, on the outer peripheral edge 63 of the breaker 60, the vicinities that come into contact with the bottom surface 51a are chamfered and rising surfaces 66 rising perpendicularly from the bottom surface 51a as peripheral surfaces along the thickness direction of the breaker 60.

As shown in FIG. 1, FIG. 2, FIG. 7, and FIG. 8, the holder 20 is made of a metal material such as carbon tool steel, etc., and formed into a columnar shape oblong in a plan view, and by notching a portion from the vicinity of the center to the outer peripheral edge so as to perforate along the rotation central axis YO at the time of cutting that matches the central axis Y, the discharging recess 22 for discharging shavings 70 is formed. The holder 20 has, on both end faces, receiving surfaces 21 (21A and 21B) recessed so as to receive the tip end portions 2 of the pair of electrode tips 1A and 1B, and a surface of a part of the discharging recess is used as an attaching surface 23 to which the cutter 40 is attached. In the attaching surface 23, a screw hole 27 into which the attaching screw 55 is screwed is formed. The cutter 40 is attached to the holder 20 by putting the back side 53 of the cutter 40 on the attaching surface 23 and screwing the attaching screw 55 to be inserted through the attaching hole 50 into the screw hole 27.

On the peripheral edge of the attaching surface 23, a positioning projection 24 with which the tip end face 40a of the cutter 40 is brought into contact, and positioning projections 25 and 26 that are fitted to the positioning recesses 43 and 44 of the cutter 40 are formed.

On the arc-shaped outer peripheral surface of the holder 20, small flange portions 28 and 29 provided on the lower edge side and large flange portions 31 and 32 provided on the upper edge side are formed. These small flange portions 28 and 29 and large flange portions 31 and 32 have arc-shaped outer peripheral surfaces around the rotation central axis YO, however, the outer diameters around the rotation central axis YO of the large flange portions 31 and 32 are set to be larger than the outer diameters from the rotation central axis YO of the small flange portions 28 and 29 below the large diameter portions. In the large flange portion 31, an insertion recess 31a recessed in a substantially semicircular shape for fixing the holder 20 to the rotary drive portion 12 is formed.

Figure 9:
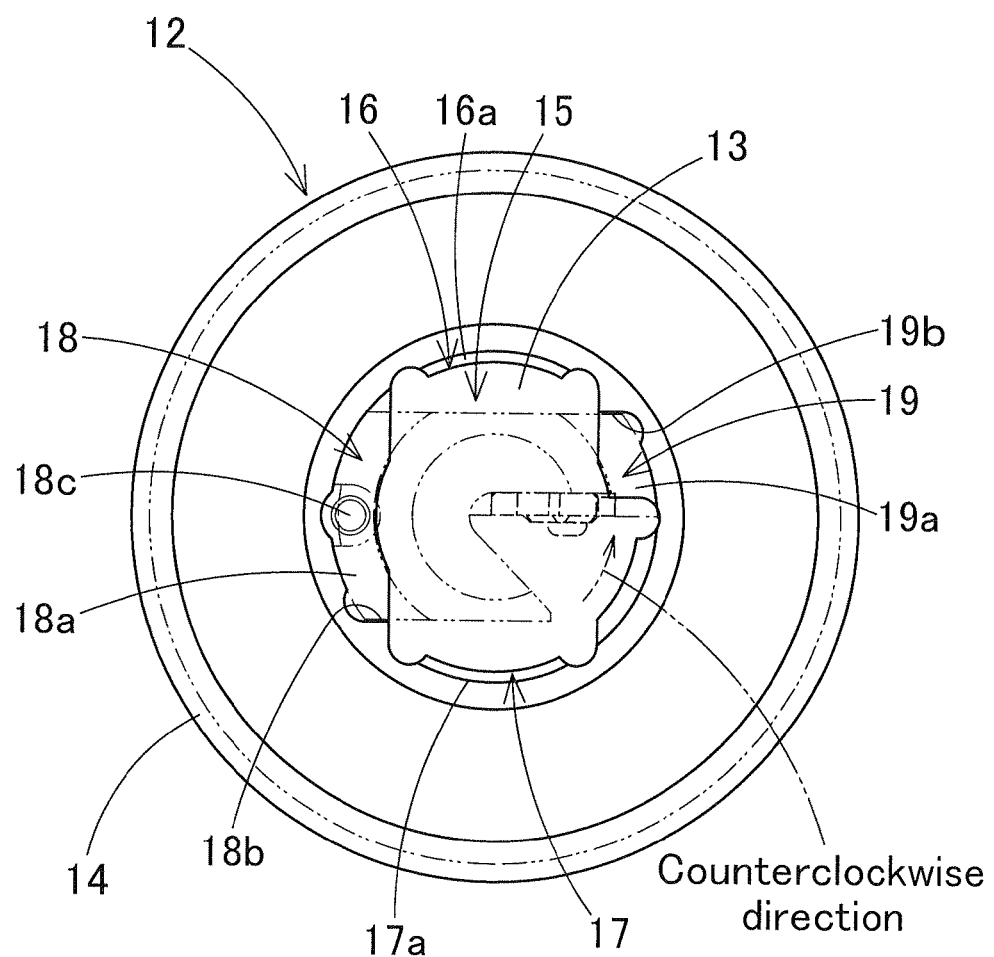
FIG. 9 is a plan view showing a rotary drive portion in the tip dresser according to the first embodiment.
Figure 10:
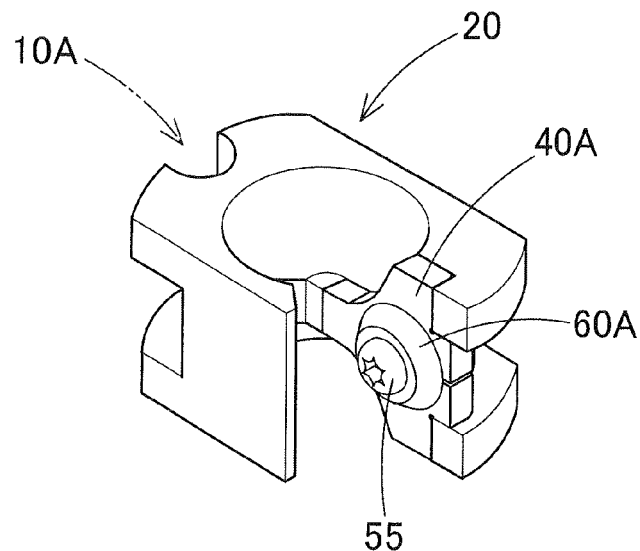
FIG. 10 is a perspective view showing a state where a cutter and a breaker are tightened together to a holder in a tip dresser according to a second embodiment.
Figure 11:
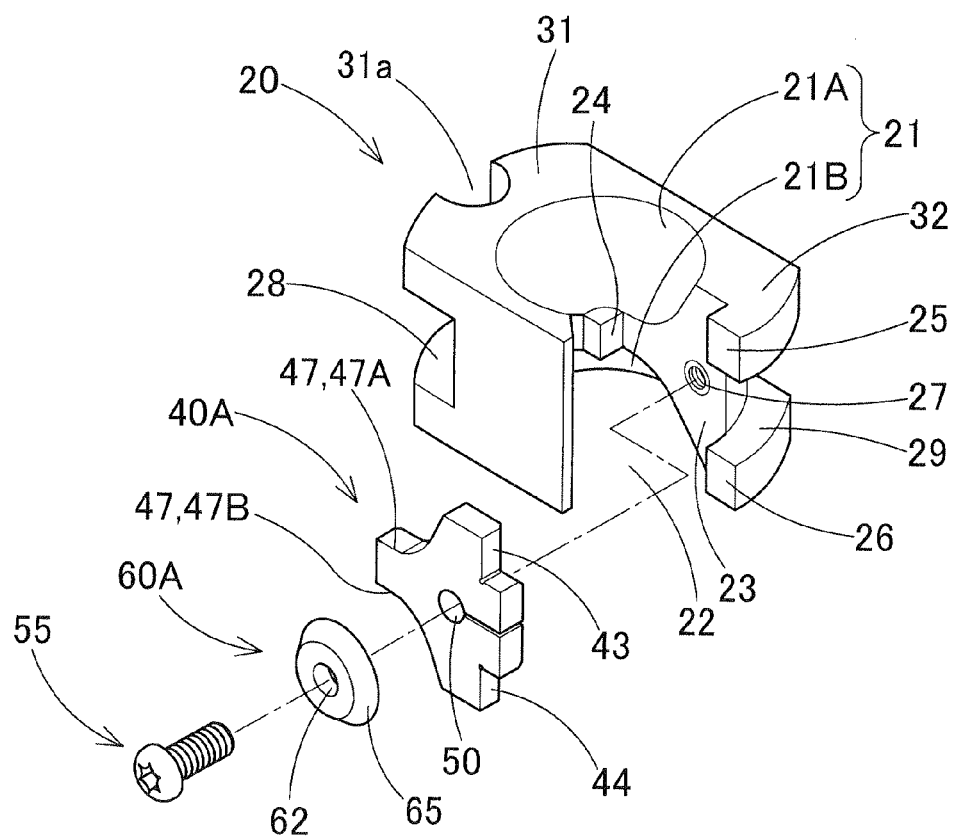
FIG. 11 is an exploded perspective view of the holder, the cutter, the breaker, and an attaching screw in the tip dresser according to the second embodiment.
Figure 12A:
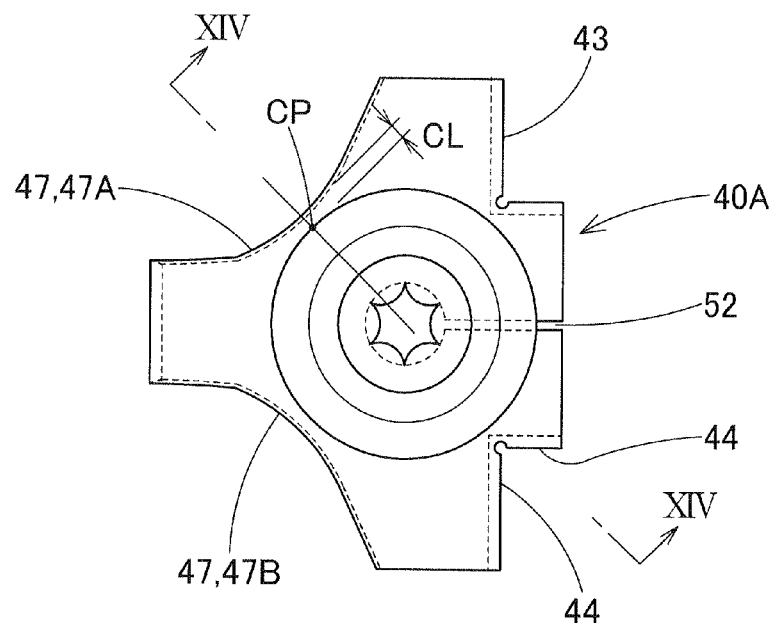
FIG. 12 is a front view showing a state where the cutter and the breaker are attached to the holder and components according to the second embodiment.
Figure 12B:
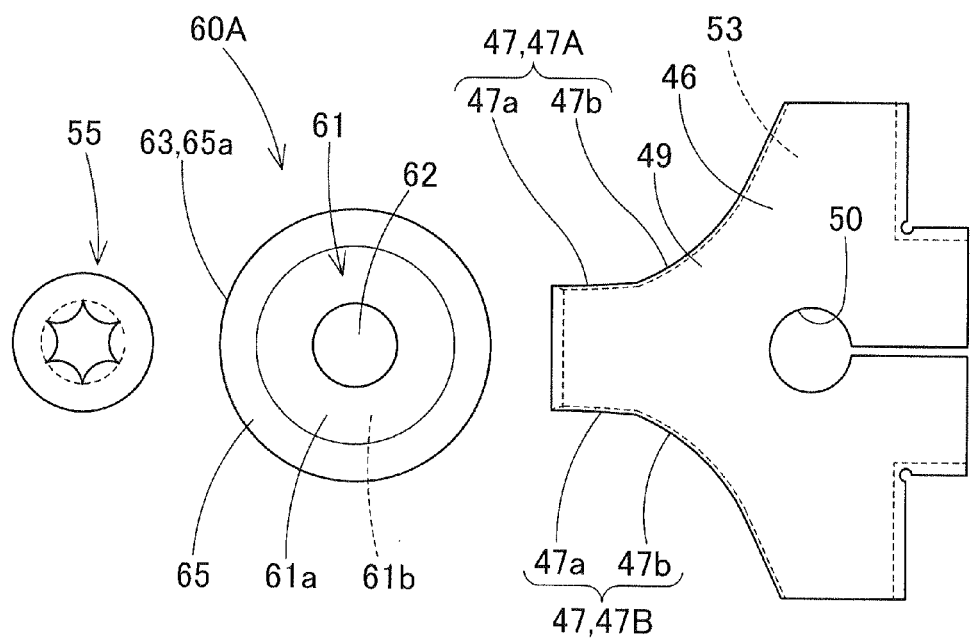
Figure 13A:
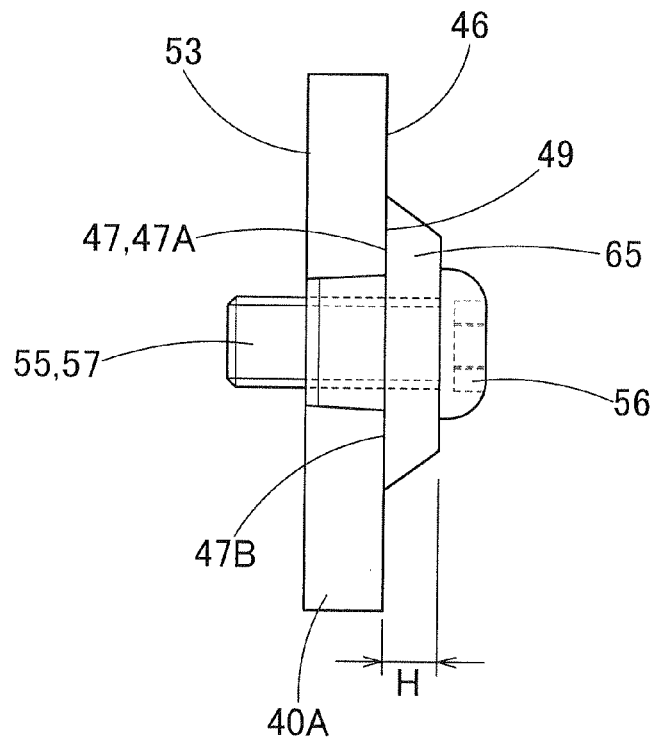
FIG. 13 is a side view showing a state where the cutter and the breaker are attached to the holder and components according to the second embodiment.
Figure 13B:
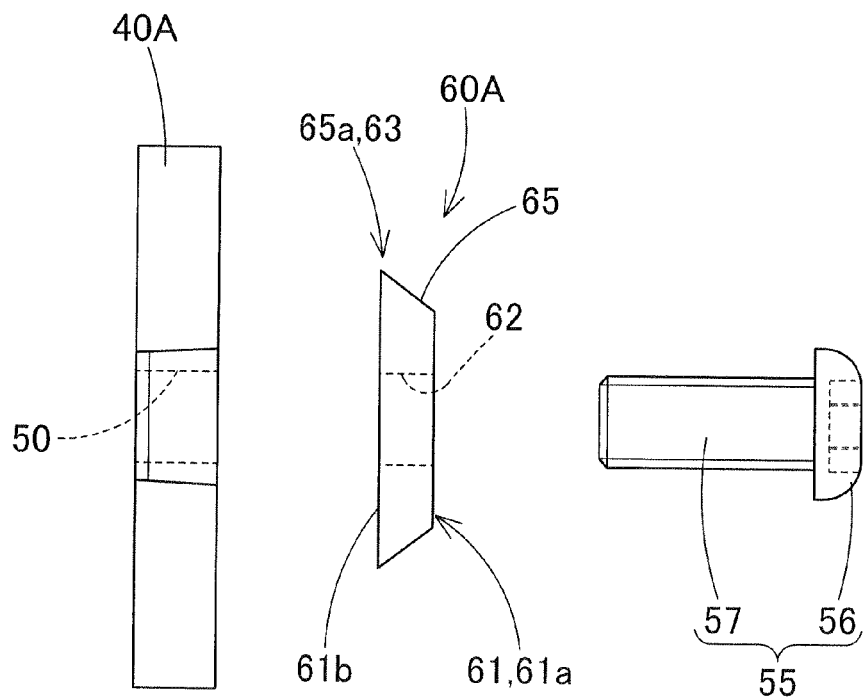
Figure 14A:
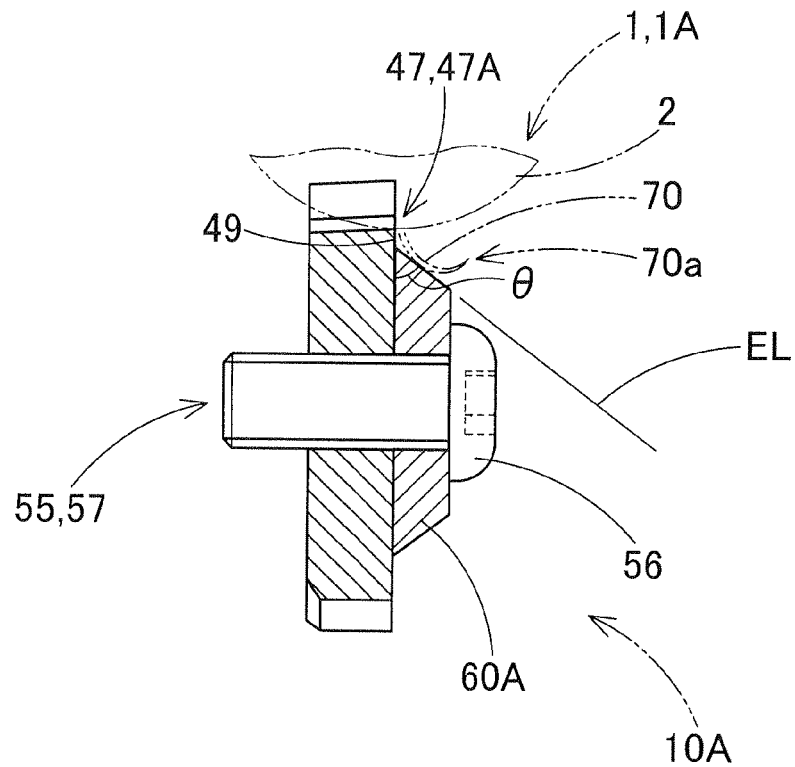
FIG. 14 is a view describing a state of a shaving when an electrode tip is cut with the tip dresser according to the second embodiment, corresponding to a section taken along XIV-XIV in FIG. 12.
Figure 14B:
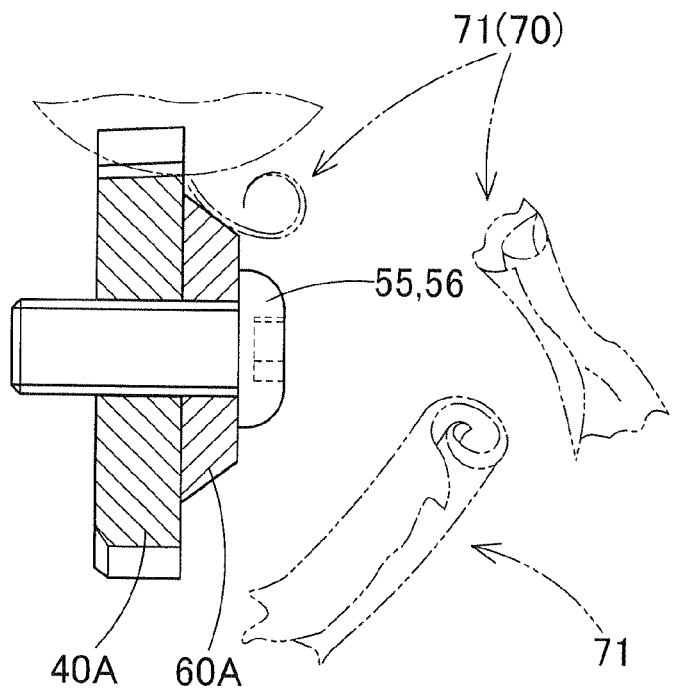

As shown in FIG. 8 and FIG. 9, the rotary drive portion 12 is supported turnably while being surrounded by the housing 11, and has a through hole 13 perforating in the up-down direction for housing and holding the holder 20 on the inner peripheral side, and a tooth portion 14 disposed on the outer peripheral side to which a rotating drive force from a rotary drive source such as a predetermined servo motor is transmitted. On the inner peripheral surface of the through hole 13, a housing portion 15 for housing and holding the holder 20 is disposed, and the housing portion 15 includes first support portions 16 and 17 and second support portions 18 and 19.

The first support portions 16 and 17 become portions that support the large flange portions 31 and 32 by support surfaces 16a and 17a on the upper surface sides of the first support portions when the holder 20 is inserted from the upper side of the through hole 13, and the second support portions 18 and 19 become portions that support the large flange portions 31 and 32 by support surfaces 18a and 19a on the upper surface sides of the second support portions 18 and 19 when the holder 20 supported by the first support portions 16 and 17 is rotated 90 degrees counterclockwise around the rotation central axis YO as shown in FIG. 9. When rotating, the holder 20 comes into contact with position restricting surfaces 19a and 19b and is stopped in position. This stop position is a cutting position of the electrode tips 1A and 1B of the cutter 40 attached to the holder 20.

The small flange portions 28 and 29 of the holder 20 are smaller in outer diameter than the large flange portions 31 and 32, so that the small flange portions do not interfere with the first support portions 16 and 17 when the holder 20 is inserted into the housing portion 15 from the upper side of the through hole 13.

When this holder 20 is disposed at the cutting position, on the second support portion 18, a screw hole 18c is formed at a position corresponding to the insertion recess 31a of the large flange portion 31 of the holder 20. A screw 35 is screwed into the screw hole 18c through the insertion recess 31a, and by this screw 35, the holder 20 is attached and fixed to the rotary drive portion 12.

The second support portion 19 is formed so that the portion near the base portion 42 of the cutter 40 disposed at the cutting position becomes a projecting portion smaller than the second support portion 18 to prevent interference with the base portion 42 side of the cutter 40 attached to the holder 20 when the holder 20 is rotated counterclockwise after it is supported by the first support portions 16 and 17.

In the tip dresser 10 according to the first embodiment, the cutter 40 can be tightened to the holder 20 together with the breaker 60 by fitting the breaker 60 into the breaker housing recess 51 of the cutter 40, putting the back side 53 of the cutter 40 on the attaching surface 23 while putting the positioning projections 24, 25 and 26 on a tip end surface 41a and the positioning recesses 43 and 44, and screwing the attaching screw 55 into the screw hole 27 through the insertion hole 62 and attaching hole 50.

Thereafter, the holder 20 is housed in the housing portion 15 of the rotary drive portion 12. Specifically, the large flange portions 32 and 33 are supported by the support surfaces 16a and 17a of the first support portions 16 and 17 by inserting the holder 20 into the through hole 13, and then, as shown in FIG. 9, by rotating the holder 20 counterclockwise, the large flange portions 32 and 33 are put on the position restricting surfaces 18b and 19b while being supported by the support surfaces 18a and 19a of the second support portions 18 and 19, and thereafter, the screw 35 is screwed into the screw hole 18c through the insertion recess 31a, whereby attaching and fixing the holder 20 to which the cutter 40 and the breaker 60 are attached to the rotary drive portion 12.

Thereafter, in the tip dresser 10 according to the first embodiment, the predetermined rotary drive source is actuated, and the rotating drive force is transmitted to the tooth portion 14 of the rotary drive portion 12 to rotate the holder 20 together with the rotary drive portion 12, and the pair of electrode tips 1A and 1B are pressed against the receiving surfaces 21A and 21B of the holder 20 from the tip end face 3 sides of the tip end portions 2, whereby cutting the tip end portions 2 of the electrode tips 1A and 1B by the cutting blades 47A and 47B of the cutter 40.

At this time, as shown in A and B of FIG. 5, the strip of shaving 70 extends continuously along the flat portion 49 near the cutting blade 47A from the cutting blade 47A of the cutter 40. However, the inclined guide surface 65A disposed on the outer peripheral edge 63 of the breaker 60 inclines so as to bulge from the flat portion 49 while inclining from the flat portion 49 of the surface side 46 near the cutting blade 47A of the cutter 40, and the tip end 70A of the shaving 70 is guided by the inclined guide surface 65A on the outer peripheral edge 63 of the breaker 60 and curved, and further, pushed out by the following shaving 70. At this time, the following shaving 70 is also guided by the inclined guide surface 65A and curved and pushes the tip end 70a side of the shaving 70 out, so that the shaving 70 is formed into a coiled shape rolled around the tip end 70a side. The inclined guide surface 65A is disposed near the cutting blade 47A, so that, as shown in B of FIG. 5, the coiled shaving 71 becomes small in diameter, and separates from the following shaving 70 and falls from the discharging recess 22 due to its own weight, etc., before the size of the shaving reaches a large size that jams inside the discharging recess 22, and as a result, the shaving 71 in a coiled shape with a small diameter is smoothly discharged from the discharging recess 22 of the holder 20.

Such shaving 71 in a coiled shape with a small diameter is also formed in the same manner on the cutting blade 47B side.

Therefore, in the tip dresser 10 according to the first embodiment, shavings 70 and 71 can be smoothly discharged by the breaker 60 provided on the cutter 40, and the tip end portions 2 of the electrode tips 1A and 1B can be efficiently and finely cut and the work can be quickly shifted to the next welding work.

In the tip dresser 10 according to the first embodiment, the breaker 60 is formed into a plate shape separate from the cutter 40 and tightened to the holder 20 together with the cutter 40 by the attaching screw 55, and the breaker 60 serves as a washer of the attaching screw 55, so that it also contributes to improvement in attaching strength of the cutter 40 to the holder 20.

Figure 6A:
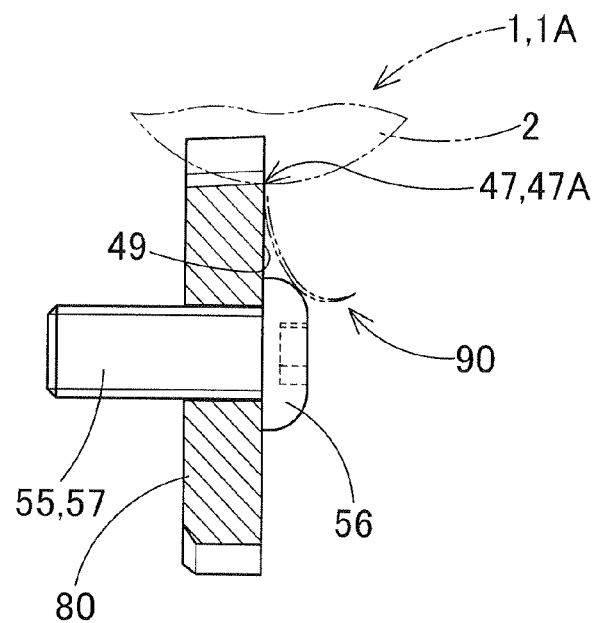
FIG. 6 is a comparative example describing a state of a shaving when an electrode tip is cut, showing a state without the breaker according to the first embodiment.
Figure 6B:
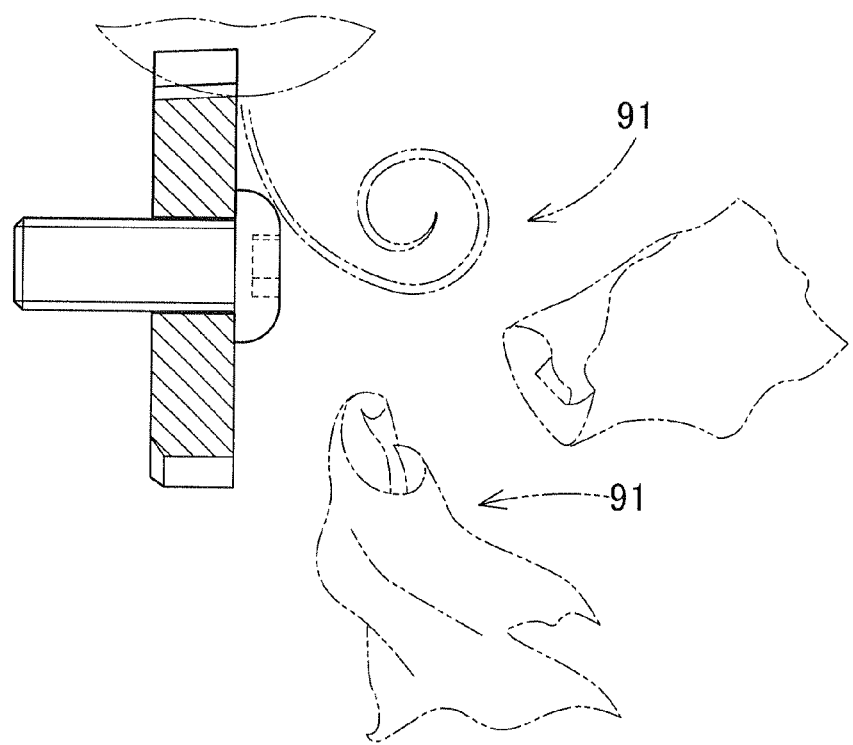
Figure 7:
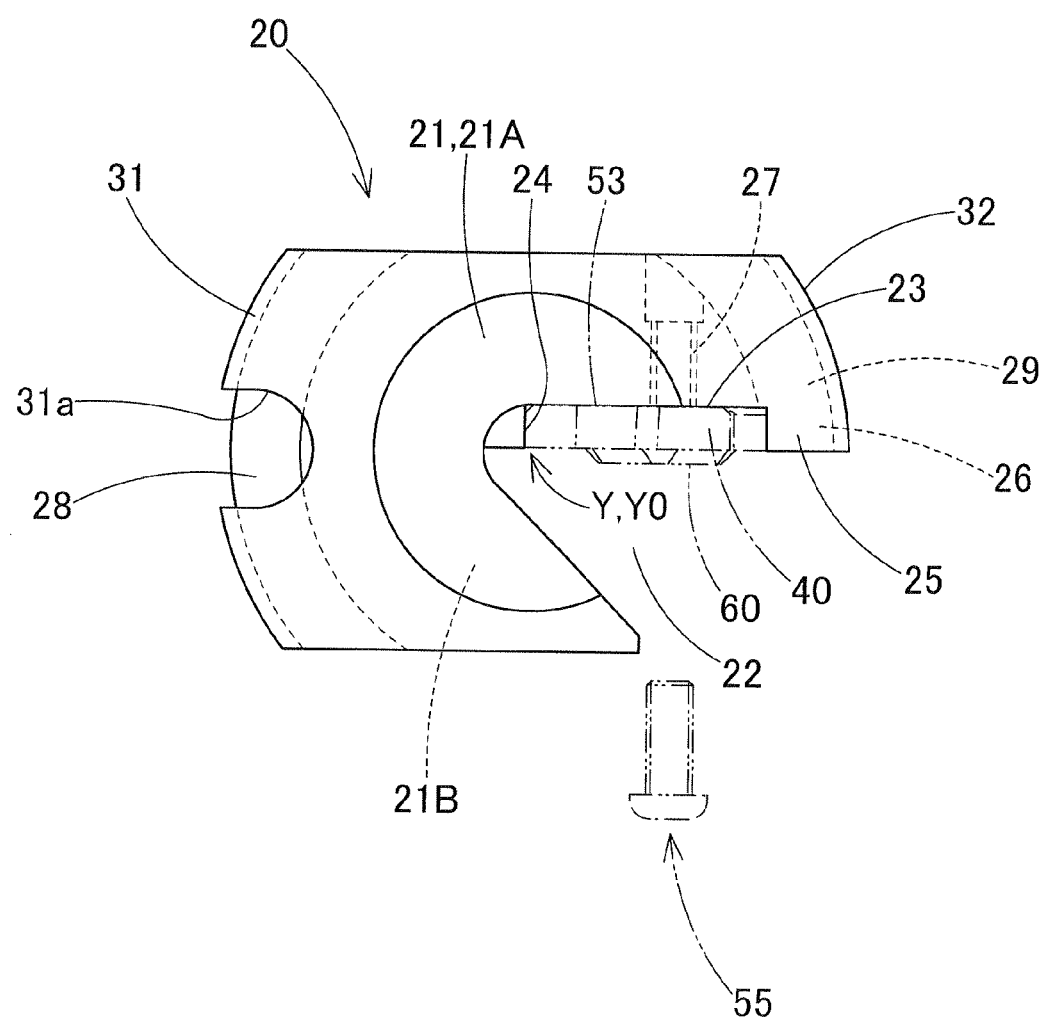
FIG. 7 is a schematic plan view showing a state where the cutter and the breaker are tightened together to the holder in the tip dresser according to the first embodiment.

Like the cutter 80 of a comparative example shown in FIG. 6, in the case where the cutter does not have the breaker 60 and is formed of only the flat portion 49 from the cutting blade 47 to the head portion 56 of the attaching screw 55, as shown in A and B of FIG. 6, the shaving 90 from the cutting blade 47 hits against the head portion 56 and is greatly curved, and becomes shaving 91 in a curved plate shape partially having a coiled portion and may jam the discharging recess 22.

In the tip dresser 10 according to the first embodiment, the breaker 60 is disposed so that the shortest distance CL on the outer peripheral edge 65 of the inclined guide surface 65 to the cutting blade 47 is set to 1 mm in the range of 0.3 to 1.5 mm, and the inclination angle $\theta$ of each inclined guide surface 65 from the flat portion 49 is set to 45 degrees in the range of 30 to 60 degrees as an angle that prevents the straight line (extended line) EL extended along the inclination angle $\theta$ to the attaching screw 55 side from the closest position CP on the outer peripheral edge 65a of the inclined guide surface 65 to the cutting blade 47 from crossing the head portion 56 of the attaching screw 55.

Specifically, in this tip dresser 10, at the closest position CP on the inclined guide surface 65 of the breaker 60 to the cutting blade 47, the inclination angle $\theta$ of each inclined guide surface 65 is set to 45 degrees in the range of 30 to 60 degrees as an angle that prevents the straight extended line EL extending from the inclined guide surface 65 to the attaching screw 55 side from crossing the head portion 56 of the attaching screw 55. Therefore, in the embodiment, the breaker 60 can stably roll the shaving 70 extending from the cutting blade 47 into a coiled shape with a small diameter without contact with the head portion 56 of the attaching screw 55.

Incidentally, if the inclination angle θ is less than 30 degrees, it is difficult to roll the shaving 71 into a coiled shape with a small diameter, and if the inclination angle θ is as large as 60 degrees or more, the shaving 71 easily hits against the electrode tip 1 and a fine cut surface is hardly secured, so that the inclination angle θ of the inclined guide surface 65 at the closest position CP to the cutting blade 47 is set in the range of 30 to 60 degrees, preferably about 45 degrees in the range of 40 to 50 degrees.

Further, by setting the distance at the closest position CP on the inclined guide surface 65 of the breaker 60 to the cutting blade 47, that is, the shortest distance CL on the inclined guide surface 65 to the cutting blade 47 to 1 mm in the range of 0.3 to 1.5 mm, cutting of the cutting blade 47 is prevented from being obstructed, and the shaving 70 can be formed into a coiled shape with a small diameter and discharged. Specifically, if the shortest distance CL of the inclined guide surface 65 is less than 0.3 mm and the inclined guide surface is excessively close to the cutting blade 47, a part of the tip end portion 2 of the electrode tip 1 before being cut may hit against a part of the breaker 60 earlier than the cutting blade 47 and obstruct cutting of the cutting blade 47. If the shortest distance CL of the inclined guide surface 65 is as large as more than 1.5 mm, the diameter of the coiled shaving 71 cannot be made small, and the operation and effect of forming shaving 71 in a coiled shape with a large diameter and discharging it from the discharging recess 22 may be obstructed.

As a result, in order to obtain the operation and effect of discharging the shaving 71 by forming the shaving 71 into a coiled shape with a small diameter without obstructing cutting of the cutting blade 47, it is desirable that the shortest distance CL of the inclined guide surface 65 to the cutting blade 47 is set in the range of 0.3 to 1.5 mm, preferably in the range of 0.6 to 1.2 mm.

Further, in the tip dresser 10 according to the first embodiment, on the peripheral edge of the attaching hole 50 on the surface side 46 of the cutter 40, a breaker housing recess 51 recessed in a shape equal to at least the shape of the outer peripheral edge 65a on the cutting blade 47 side of the breaker 60 is provided so as to house at least the portion of the cutter 40 side (the portions of the rising surfaces 66) on the cutting blade 47 side of the breaker 60. This breaker housing recess 51 is formed to have a depth T0 that divides each inclined guide surface 65 into a housed region 65b housed in the breaker housing recess 51 and a projecting region 65c projecting from the flat portion 49 in the thickness direction of the breaker 60 when the breaker housing recess houses the breaker 60.

Specifically, in the tip dresser 10 according to the first embodiment, the edge (outer peripheral edge) 65a on the cutting blade 47 side of the inclined guide surface 65 of the breaker 60 is housed inside the breaker housing recess 51. Therefore, the outer peripheral edge 65a of the inclined guide surface 65 is disposed to sink from the flat portion 49 near the cutting blade 47 of the cutter 40 to the cutter 40 side, and even when the tip end 70a of the shaving 70 moves along the flat portion 49 just before coming into contact with the inclined guide surface 65, the shaving smoothly comes into contact with the inclined guide surface 65 from the flat portion 49 and is curved. Incidentally, when the outer peripheral edge 65a of the inclined guide surface 65 bulges from the flat portion 49, even if a small clearance is formed between the outer peripheral edge 65a of the inclined guide surface 65 and the flat portion 49, the tip end 70a of the shaving 70 may enter the clearance and the shaving 70 may jam at the outer peripheral edge 65a of the inclined guide surface 65, however, in the above-described configuration, such a jamming state can be avoided.

Further, in the first embodiment, the outer peripheral edges 65a (straight portions 64A and 64B) of two of the inclined guide surfaces 65A and 65B corresponding to the cutting blades 47A and 47B on both edges of the cutter 40 are formed to be straight symmetrically to each other about the center between the cutting blades 47A and 47B of the cutter 40.

Therefore, in the first embodiment, when the shaving 70 produced from the cutting blade 47A, 47B is formed into a strip-like coiled shape, like the shaving 71(A) shown in B of FIG. 5, the length in the width direction of the strip of shaving 71 can be easily secured as long as the length of the straight portion of the outer peripheral edge 65a of the inclined guide surface 65A, 65B, and as a result, the shaving 71 becomes a coiled shape with a small diameter that is a long tubular body, and is smoothly discharged without jamming in the discharging recess 22.

Even when the outer peripheral edges 65a of the inclined guide surfaces 65A and 65B of the breaker 60 are straight, the breaker 60 is housed in the breaker housing recess 51, and when the breaker is tightened by the attaching screw 55, the position of the breaker 60 is restricted by the inner peripheral surface 51b of the breaker housing recess 51, and the breaker 60 does not rotate, and the inclined guide surfaces 65A and 65B formed into straight outer peripheral edges 65a can be disposed near the cutting blades 47A and 47B without positional deviations.

In the first embodiment, the breaker 60 is formed into a substantially square plate shape, however, it may be formed into a triangular plate shape or a fan-like plate shape as long as the inclined guide surfaces 65A and 65B formed into straight outer peripheral edges 65a can be disposed near the cutting blades 47A and 47B.

When the breaker is formed into a plate shape that is a polygonal shape such as a square shape or a triangular shape or a fan-like shape, at the time of screwing of the attaching screw, by providing rotation restricting engagement portions formed into recesses and projections corresponding to the vicinity of the base portion side of the cutter and the breaker to prevent the breaker from rotating, the breaker may not be housed in the breaker housing recess. Of course, in this case, the outer peripheral edges 65a of the inclined guide surfaces 65 are formed into sharp edges that come into close contact with the flat portions 49 to prevent the tip ends of shavings from entering the clearances between the flat portions and the inclined guide surfaces.

Incidentally, as in the tip dresser 10A according to the second embodiment shown in FIG. 10 to FIG. 15, the breaker 60A may be formed into a disk shape having an insertion hole 62 through which the attaching screw 55 is inserted at the center and an inclined guide surface 65 provided on the entire circumference of the outer peripheral edge 63. In this tip dresser 10A, the cutter 40A does not have the breaker housing recess 51, and is formed by providing a smooth flat portion 49 from the cutting blades 47A and 47B to the attaching hole 50. In this tip dresser 10A, the same holder 20 and rotary drive portion 12 as those in the first embodiment are used.

In this tip dresser 10A, the breaker 60A also includes an attaching substrate portion 61 extending in a substantially plane shape from the peripheral edge of the insertion hole 62 to be pressed by the head portion 56 of the attaching screw 55 when the breaker 60A is tightened together with the cutter, and the inclined guide surface 65 on the outer peripheral edge of the attaching substrate portion 61 is disposed near the cutting blades 47A and 47B so as to bulge from the flat portion 49 on the surface side 46 near the cutting blades 47A and 47B while inclining from the flat portion 49 to guide the shavings 70 produced from the portions of the cutting blades 47A and 47B away from the surface side 46.

In greater detail, this breaker 60A is disposed so that the shortest distance CL on the outer peripheral edge 65a of the inclined guide surface 65 to the cutting blade 47 is set to 0.6 mm in the range of 0.3 to 1.5 mm. In addition, the inclination angle θ of the inclined guide surface 65 from the flat portion 49 is set to 45 degrees in the range of 30 to 60 degrees as an angle that prevents the straight line (extended line) EL extended along the inclination angle θ to the attaching screw 55 side from the closest position CP on the outer peripheral edge 65a of the inclined guide surface 65 to the cutting blade 47 from crossing the head portion 56 of the attaching screw 55. The projecting height H of the inclined guide surface 65 from the flat portion 49 is also set to 2 mm in the range of 0.5 to 3 mm.

Therefore, with this tip dresser 10A, as in the first embodiment, the operation and effect of forming the shavings 70 into coiled shapes with small diameters and discharging the shavings without obstructing cutting of the cutting blades 47 can be obtained.

Further, in the tip dresser 10A according to the second embodiment, the breaker 60A is formed into a disk shape, so that when the breaker 60A is tightened to the holder 20 together with the cutter 40A by the attaching screw 55, even if the breaker 60A rotates, the position at which the inclined guide surface 65 is disposed with respect to the cutting blades 47 does not change, and the breaker 60A and the cutter 40A can be easily tightened together to the holder 20.

In the second embodiment, the outer peripheral edge 65a is formed into a sharp edge that comes into close contact with the flat portion 49 so as to prevent the tip end 70a of shaving 70 from entering the clearance between the flat portion 49 and the inclined guide surface 65, however, as in the first embodiment, it is also possible that the breaker housing recess 51 for housing the breaker 60A is formed on the peripheral edge of the attaching hole 50 on the surface side 46 of the cutter 40A to sink the outer peripheral edge 65a of the inclined guide surface 65 from the flat portion 49.

Figure 16A:
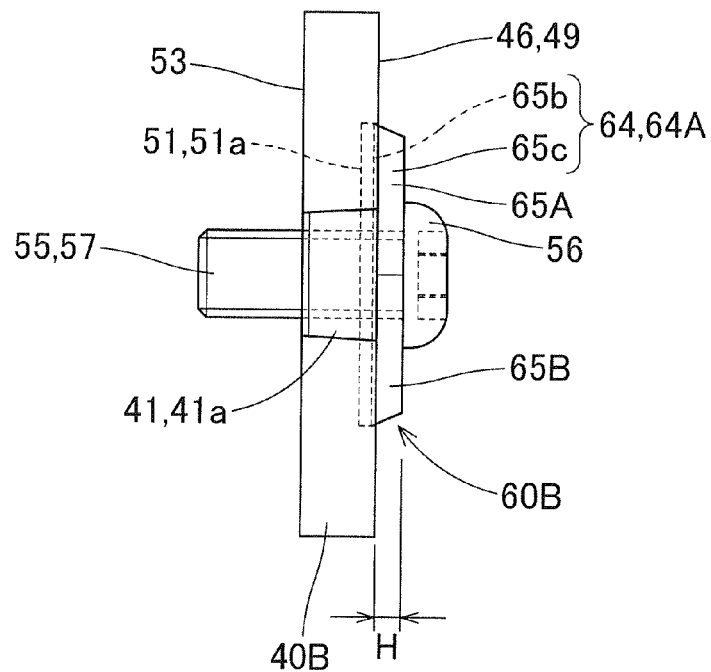
FIG. 16 is a side view showing a state where the cutter and the breaker are attached to the holder and components according to the third embodiment.
Figure 16B:
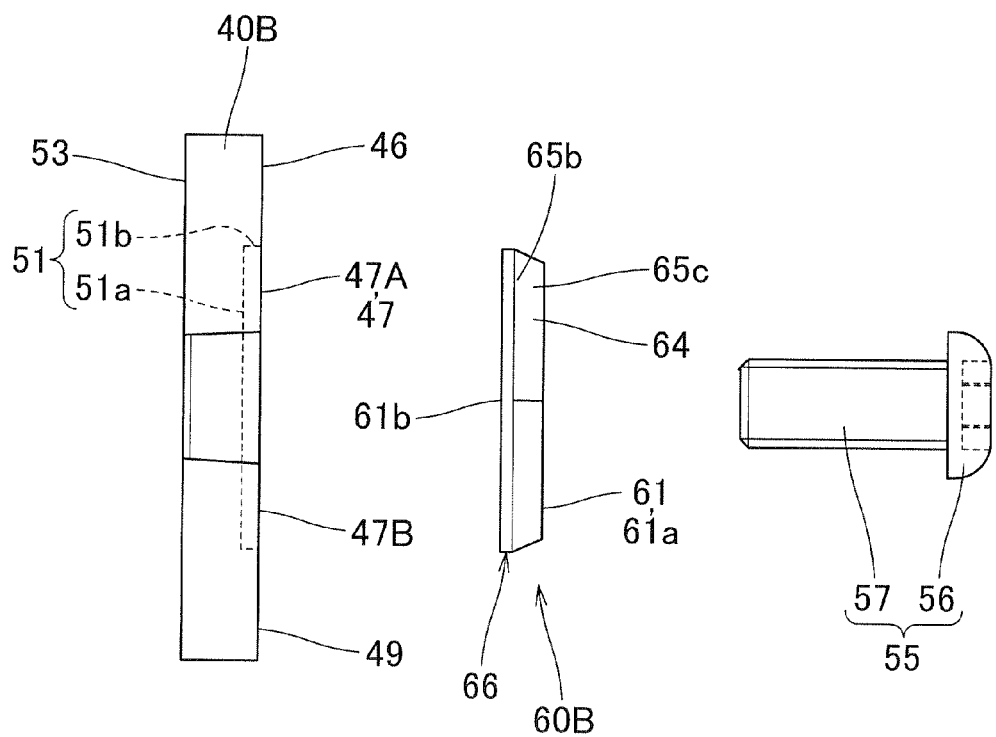

The first embodiment shows the case where inclined guide surfaces 65 are disposed on four straight portions 64 (64A, 64B, 64C, and 64D) corresponding to the four sides of the outer peripheral edge 63 of the breaker 60 in the substantially square shape. However, like the breaker 60B that is fitted to the cutter 40B shown in FIG. 15 and FIG. 16 according to a third embodiment, the inclined guide surfaces 65A and 65B corresponding to the cutting blades 47 (47A, 47B) are formed on only the straight portions 64A and 64B of two sides adjacent to each other of the substantially square shape. On the straight portions 64C and 64D of the remaining two sides, it is possible that the inclined guide surfaces 65 are not provided but the attaching substrate portion 61 is extended, and side surfaces (rising surfaces) 67 along the thickness direction of the breaker 60B are just provided. In this configuration, after the substantially square plate that is the external shape of the breaker 60B is cut out from the breaker material, in a state where the rising surfaces 66 and the side surfaces 67 are left on the outer peripheral edge 63, only by performing machining to provide the insertion hole 62 and the two inclined guide surfaces 65A and 65B, the breaker 60B can be manufactured, so that the number of manufacturing processes and manufacturing cost of the breaker 60B can be reduced.

Even in this third embodiment, the breaker 60B is tightened to a predetermined holder together with the cutter 40B by using the attaching screw 55, and the shortest distance CL on the outer peripheral edge 65a of the inclined guide surface 65A, 65B to the cutting blade 47A, 47B is set to 1.2 mm in the range of 0.3 to 1.5 mm. The inclination angle θ (not illustrated) of the inclined guide surface 65A, 65B from the flat portion 49 is also set to 45 degrees in the range of 30 to 60 degrees as an angle that prevents the straight line (extended line) EL extended along the inclination angle θ to the attaching screw 55 side from the closest position CP on the outer peripheral edge 65a of the inclined guide surface 65A, 65B to the cutting blade 47A, 47B from crossing the head portion 56 of the attaching screw 55. Further, the inclined guide surface 65A, 65B of the breaker 60B is configured to be divided into a small housed region 65b that is housed inside the breaker housing recess 51 and a projecting region 65c that projects from the flat portion 49 when the breaker 60B is housed inside the breaker housing recess 51 of the cutter 40B by putting the back side 61b on the bottom surface 51a. Of course, the projecting height H of this projecting region 65c is set so as to separate shavings produced from the portion of the cutting blade 47A, 47B away from the surface side 46. Specifically, this projecting height H is set not to narrow the discharging recess of the holder as much as possible, specifically, to 1 mm in the range of height capable of forming shaving into a coiled shape.

DESCRIPTION OF REFERENCE SYMBOLS 1 (1A, 1B): Electrode tip
2: Tip end portion
3: Front end face
4: Expanding portion
10, 10A: Tip dresser
12: Rotary drive portion
20: Holder
21 (21A, 21B): Receiving surface
22: Discharging recess
23: Attaching surface
27: Screw hole
40, 40A, 40B: Cutter
41: Tip end portion
42: Base portion
46: Surface side
47 (47A, 47B): Cutting blade
49: Flat portion
50: Attaching hole
51: Breaker housing recess
53: Back side
55: Attaching screw
56: Head portion
60, 60A, 60B: Breaker
61: Attaching substrate portion
62: Insertion hole
63: Outer peripheral edge
64 (64A, 64B, 64C, 64D): Straight portion
65 (65A, 65B): Inclined guide surface
65a: Outer peripheral edge
65b: Housed region
65c: Projecting region
67: (Rising surface) side surface
70, 71: Shaving
Y: Central axis (of electrode tip)
YO: Rotation central axis CP: Closest position
CL: Shortest distance
θ: Inclination angle
EL: Straight extended line

What is claimed is:

1. A tip dresser comprising:
a plate-shaped cutter that has cutting blades having shapes corresponding to the external shapes of substantially the halves of the tip end portions on one side with respect to the central axis of a pair of electrode tips on both edges in the width direction of the tip end sides disposed on the central axis side at the edge of the surface side being one side in the thickness direction so as to cut tip end faces of the tip end portions of the pair of electrode tips opposed to each other and expanding portions expanding from the tip end faces simultaneously, and an attaching hole perforating through the cutter on a base portion side away from the portion between the two cutting blades;
a holder that has receiving surfaces recessed so as to receive the tip end portions of the pair of electrode tips on both end face sides, and an attaching surface which is a part of a discharging recess for discharging shavings formed to penetrate along a rotation central axis at the time of cutting that matches the central axis, and to which the cutter is attached by putting the back side that is opposite to the surface side and becomes the cutting blade side of the cutter on the attaching surface and screwing an attaching screw inserted through the attaching hole; and
a rotary drive portion that holds rotatably the holder to which the cutter is attached, where
a breaker for discharging shavings is disposed on the surface side of the cutter, wherein
the breaker is formed to have a plate shape having a through hole through which the attaching screw is inserted so that the breaker is tightened together with the cutter by the attaching screw, and includes
an attaching, substrate portion that extends in substantially a plane shape from a peripheral edge of the insertion hole to be pressed by the head portion of the attaching screw at the time of tightening, and
inclined guide surfaces that are disposed on the outer peripheral edge of the breaker around the attaching substrate portion, and are disposed near the cutting blades so as to bulge from flat portions of the surface side while inclining from the flat portions and guide the shavings produced from the portions of the cutting blades to separate the shavings away from the surface side.

2. The tip dresser according to claim 1, wherein
the breaker is disposed so that the shortest distance of the outer peripheral edge of the inclined guide surface to the cutting blade is set in the range of 03 to 1.5 mm, and
the inclination angle of each inclined guide surface from the flat portion is set in a range of 30 to 60 degrees as an angle that prevents a straight line extended along, the inclination angle to the attaching screw side from the closest position of the outer peripheral edge of the inclined guide surface to the cutting blade from crossing the head portion of the attaching screw.

3. The tip dresser according to claim 1, wherein
the cutter is provided with, on the peripheral edge of the attaching hole on the surface side, a breaker housing recess recessed in a shape equal to at least the shape of the outer peripheral edge on the cutting blade side of the breaker so as to house at least a cutter-side portion on the cutting blade side of the breaker, and
the breaker housing recess is formed to have a depth that divides each inclined guide surface into a housed region that is housed in the breaker housing recess and a projecting region that projects from the flat portion in the breaker thickness direction when the breaker housing recess houses the breaker.

4. The tip dresser according to claim 1, wherein the outer peripheral edges of two of the inclined guide surfaces corresponding to the cutting blades on both edges of the cutter are formed to be straight symmetrically to each other about the center between the cutting blades on both edges of the cutter.

5. The tip dresser according to claim 4, wherein
the breaker is formed into a substantially square plate shape, and
the inclined guide surfaces corresponding to the cutting blades on both edges of the cutter are formed on straight portions of two sides adjacent to each other of the substantially square shape of the breaker, and
on the straight portions of the remaining two sides other than the two sides having the inclined guide surfaces of the breaker, the inclined guide surfaces are not provided but the attaching substrate portion is extended, and side surfaces along the thickness direction of the breaker are provided.

6. The tip dresser according to claim 1, wherein the breaker has a disk shape having the insertion hole disposed at the center and the inclined guide surface provided on the entire circumference of the outer peripheral edge.

7. The tip dresser according to claim 2, wherein
the cutter is provided with, on the peripheral edge of the attaching hole on the surface side, a breaker housing, recess recessed in a shape equal to at, least the shape of the outer peripheral edge on the cutting blade side of the breaker so as to house at least a cutter-side portion on the cutting blade side of the breaker, and
the breaker housing recess is formed to have a depth that divides each inclined guide surface into a housed region that is housed in the breaker housing recess and a projecting region that projects from the flat portion in the breaker thickness direction when the breaker housing recess houses the breaker.

8. The tip dresser according to claim 2, wherein the outer peripheral edges of two of the inclined guide surfaces corresponding to the cutting blades on both edges of the cutter are formed to be straight symmetrically to each other about the center between the cutting blades on both edges of the cutter.

9. The tip dresser according to claim 3, wherein the outer peripheral edges of two of the inclined guide surfaces corresponding to the cutting, blades on both edges of the cutter are formed to be straight symmetrically to each other about the center between the cutting blades on both edges of the cutter.

10. The tip dresser according to claim 7, wherein the outer peripheral edges of two of the inclined guide surfaces corresponding to the cutting blades on both edges of the cutter are formed to be straight symmetrically to each other about the center between the cutting blades on both edges of the cutter.

11. The tip dresser according to claim 8, wherein
the breaker is formed into a substantially square plate shape, and
the inclined guide surfaces corresponding to the cutting blades on both edges of the cutter are formed on straight portions of two sides adjacent to each other of the substantially square shape of the breaker, and
on the straight portions of the remaining two sides other than the two sides having the inclined guide surfaces of the breaker, the inclined guide surfaces are not provided but the attaching substrate portion is extended, and side surfaces along the thickness direction of the breaker are provided.

12. The tip dresser according to claim 9, wherein
the breaker is formed into a substantially square plate shape, and
the inclined guide surfaces corresponding to the cutting blades on both edges of the cutter are formed on straight portions of two sides adjacent to each other of the substantially square shape of the breaker, and
on the straight portions of the remaining two sides other than the two sides having the inclined guide surfaces of the breaker, the inclined guide surfaces are not provided but the attaching substrate portion is extended, and side surfaces along the thickness direction of the breaker are provided.

13. The tip dresser according to claim 10, wherein
the breaker is formed into a substantially square plate shape, and
the inclined guide surfaces corresponding to the cutting blades on both edges of the cutter are formed on straight portions of two sides adjacent to each other of the substantially square shape of the breaker, and
on the straight portions of the remaining two sides other than the two sides having the inclined guide surfaces of the breaker, the inclined guide surfaces are not provided but the attaching substrate portion is extended, and side surfaces along the thickness direction of the breaker are provided.

14. The tip dresser according to claim 2, wherein the breaker has a disk shape having the insertion hole disposed at the center and the inclined guide surface provided on the entire circumference of the outer peripheral edge.

15. The tip dresser according to claim 3, wherein the breaker has a disk shape having the insertion hole disposed at the center and the inclined guide surface provided on the entire circumference of the outer peripheral edge.

16. The tip dresser according to claim 7, wherein the breaker has a disk shape having the insertion hole disposed at the center and the inclined guide surface provided on the entire circumference of the outer peripheral edge.

* * * * *